United States Patent [19]
Korner

[11] 3,870,380
[45] Mar. 11, 1975

[54] TRACK LINK UNIT
[75] Inventor: Otto Korner, Wermelskirchen, Germany
[73] Assignee: DIEHL, Nurnberg, Germany
[22] Filed: Feb. 15, 1974
[21] Appl. No.: 443,009

[30] Foreign Application Priority Data
Feb. 16, 1973 Germany............................ 2307633

[52] U.S. Cl.................................... 305/36, 156/173
[51] Int. Cl.............................................. B62d 55/20
[58] Field of Search........... 305/35, 36, 38; 156/173

[56] References Cited
UNITED STATES PATENTS
3,266,853  8/1966  Korner.................................. 305/36
3,322,472  5/1967  Ley....................................... 305/36

Primary Examiner—Philip Goodman
Attorney, Agent, or Firm—Walter Becker

[57] ABSTRACT

A track link unit having a track link with lateral tubular members connected to each other and respectively provided with grooves facing each other. The track link furthermore comprises a plate-shaped slip-on member which has a first resilient section with lateral portions resting against the lateral tubular members. The track link also comprises a second resilient section having its lateral end portions angled off from the major plane of the slip-on member and resiliently engaging the grooves of the lateral tubular members.

5 Claims, 6 Drawing Figures

TRACK LINK UNIT

The present invention concerns a track link with a plate-shaped slip-on piece which on that side which faces the road is provided with a traveling cushion, a steel support or another gripper element for snow covered or muddy ground, said slip-on piece being adapted to be locked to the track link. The slip-on piece is adapted to be slipped into the grooves of the track link up to an abutment, said grooves being located opposite to each other. The slip-on piece rests by means of a resilient locking element in the direction opposite to the slipping-in direction on a shoulder of the track link.

The required relatively great accuracy as to size of the parts of traveling cushions of the above mentioned type, and more specifically with regard to the track links proper and also with regard to the slip-in piece can be taken care of by a slip-on piece which comprises two sheet metal plates which are braced against each other by a resilient intermediate rubber layer. These sheet metal plates comprise a base plate provided with the resilient locking member, and an intermediate plate which laterally forms the slip-on strips, said plates being vulcanized onto the intermediate rubber layer between said rubber layer and a rubber traveling cushion.

A design of this type assures a firm seat of the traveling cushion on the track link at high variations in dimensions. However, with this design the intermediate rubber layer is subjected to considerable pressing or squeezing stresses and thereby is highly stressed. Furthermore, the manufacture of traveling cushions with such intermediate plate encounters difficulties which at any rate will result in additional costs.

It is, therefore, an object of the present invention to provide a track link of the above mentioned general type which will encounter less wear while it can be produced at lower manufacturing costs.

It is another object of this invention to provide a track link as set forth in the preceding paragraph which will be able elastically to bridge considerable variations and fluctuations in the dimensions of the track link, and which will at any rate assure a safe clamping of the slip-on piece in the track link and will reduce the wear during the driving operation to a minimum.

These and other objects and advantages of the invention will appear more clearly from the following specification in connection with the accompanying drawings, in which.

The track link according to the present invention which comprises a plate-shaped slip-on piece adapted to be locked onto the track link is characterized primarily in that the slip-on piece comprises two members which are resilient in themselves and are resilient toward each other, namely an upper engaging plate 15 which is provided with the resilient locking member and rests against tubes of the track link, and a laterally pulled out frame with approximately horizontally angled off side parts, said frame forming the slip-on strips while the preload for clamping and locking the slip-on member in the track link is generated by the spring effect of the engaging plate and of the frame as well as by spring portions interconnecting the same and is possibly reinforced by the elastic deformability of the vulcanized-in traveling cushion.

The engaging plate and the frame to be slipped into the grooves may consist of a single base plate which is subdivided preferably by punching while the frame is formed by downwardly bending the spring portions and by a lateral angling off of the lateral parts serving as slip-in strips. This base plate will, due to its subdivision into individual parts which are elastically deformable in themselves and toward each other, assure an optimum adaptation of the slip-on piece to the track link. Moreover, it can be produced in a simple manner regardless of whether it consists of two parts which are for instance riveted onto each other or whether it consists of a single sheet metal body which is subdivided by punching. The traveling cushion which is vulcanized to or into the slip-on piece consists of an integral piece.

Figure 1:
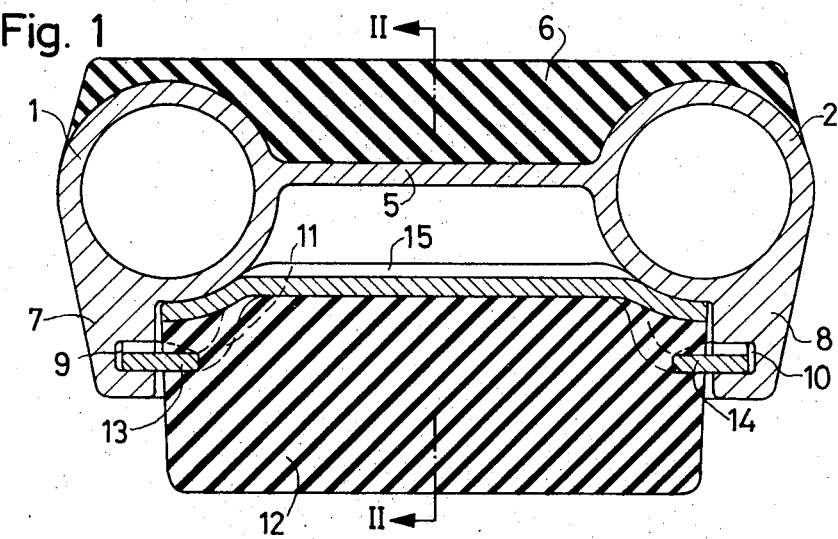
FIG. 1 is a cross section through a track link according to the invention and through a slip-on piece according to the invention which is slipped into the track link, said section being taken along the line I—I of FIG. 2.
Figure 2:
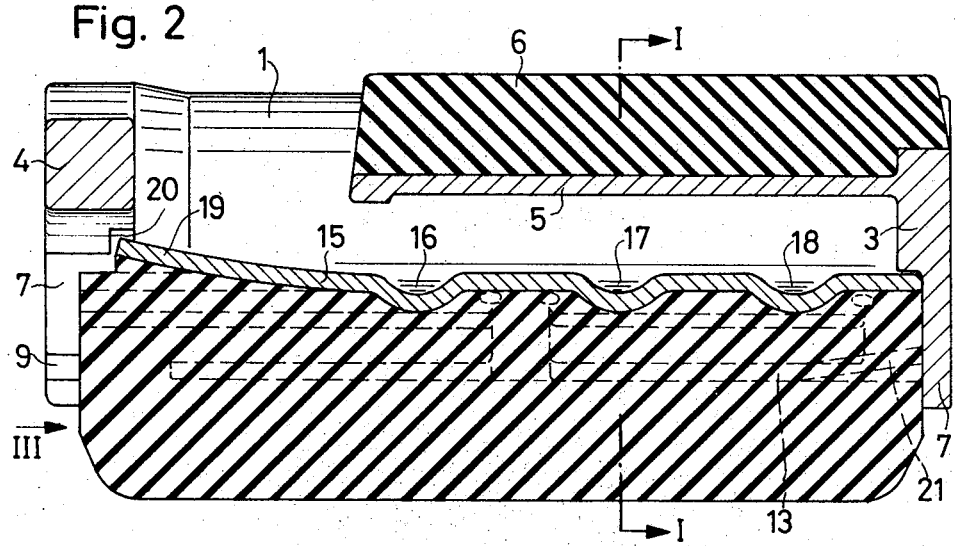
FIG. 2 illustrates a longitudinal section through the track link of FIG. 1 and the slip-on piece illustrated therein, said section being taken along the line II—II of FIG. 1.
Figure 3:
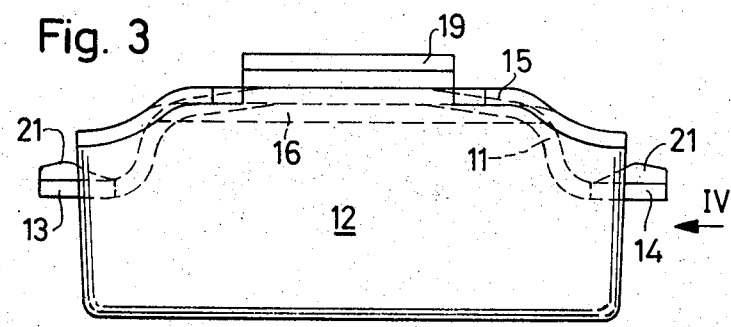
FIG. 3 is a front view of the slip-on piece as seen in the direction of the arrow III in FIG. 2.
Figure 4:
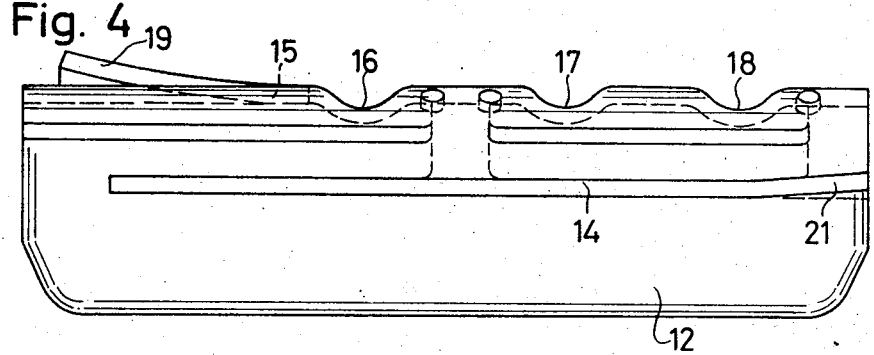
FIG. 4 is a side view of the slip-on piece as seen in the direction of the arrow IV in FIG. 3.

Referring now to the drawings in detail, the tubular track link according to FIGS. 1 and 2 comprises two tubes 1 and 2, two spectacle-shaped lateral pieces 3 and 4 and a plate 5 which interconnects the two pipes 1 and 2 and is connected to one lateral piece 3, a rubber layer 6 on the side of the traveling wheels being vulcanized onto the plate 5. At the bottom side, stand ribs 7 and 8 are cast onto the tubes 1,2, said ribs being provided with grooves 9, 10 facing each other. A frame 11 of a traveling cushion 12 is with two lateral strips 13, 14 slipped into said grooves 9, 10. The cushion 12 rests by means of an engaging plate 15 on the track link or the tubes 1 thereof. Frame 11 together with its strips 13, 14 and with the engaging plate 15 form the base body for the traveling cushion 12 which is vulcanized onto the base body. In order to prevent the engaging plate 15 from buckling, the plate 15 is provided with a plurality of transverse stiffening corrugations 16, 17, 18 which impart upon the plate 15 the necessary stiffness. The engaging plate 15 has its free end provided with a tongue 19 which is bent upwardly and which, after the slip-in piece has been slipped in, (the latter consisting of a base plate 11, 13, 14, 15 and traveling cushion 12) catches behind a shoulder 20 of part 4. Toward the rear, i.e., toward the part 3, the frame 11 is provided with inserting inclines, which means that its lateral strips 13, 14 are somewhat inclined upwardly so that the slip-on piece can more easily be slipped into the grooves 9, 10 and below the tubes 1, 2 of the track link. This rearward portion of the frame 11 has been designated with the reference numeral 21.

Figure 5:
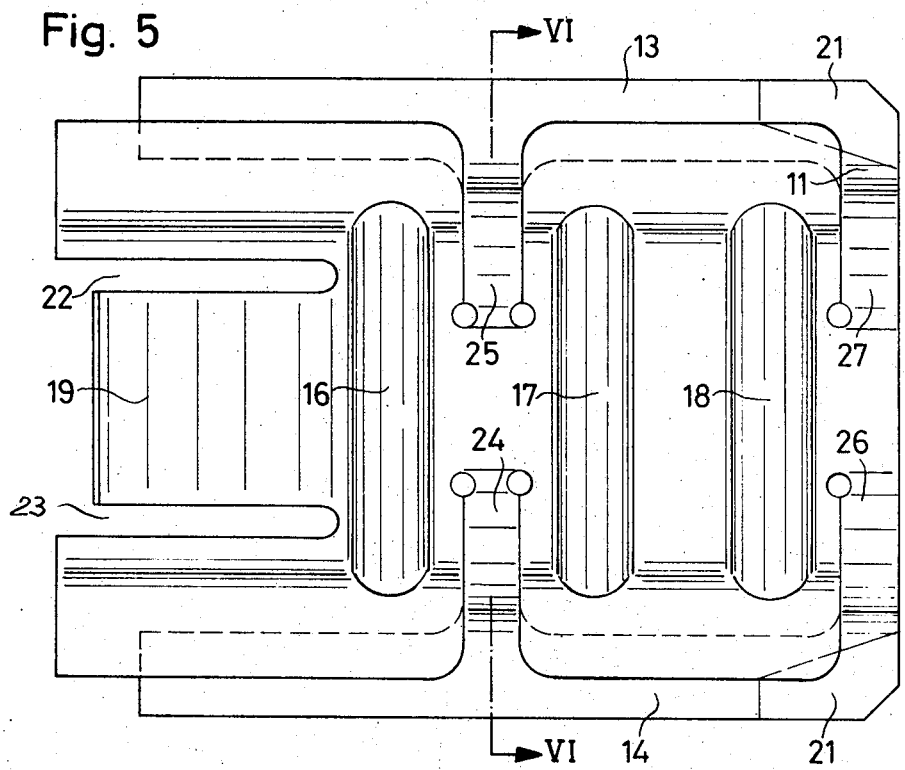
FIG. 5 is a top view of the base plate by itself.
Figure 6:
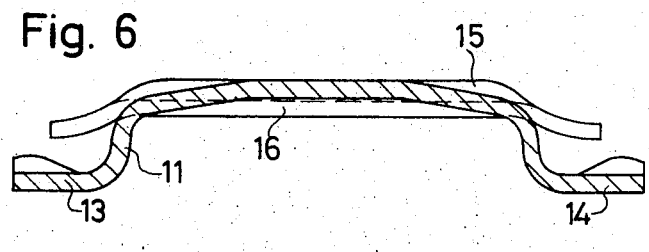
FIG. 6 illustrates a section of the base plate, said section being taken along the line VI—VI of FIG. 5.

As will be evident from the drawings, and in particular from FIG. 5, the base body forms a part which is correspondingly subdivided by punching. Thus, the tongue 19 is laterally divided from the engaging plate 15 by two cuts 22 and 23. Similarly, the frame 11 with the slip-in strips 13, 14 and the inclined transverse part 21 are separated from the engaging plate 15 by punching and are subsequently so deformed that the plate 15 and frame 11 become effective in two planes. Connecting webs 24, 25, 26 and 27 which are separated from the engaging plate 15 and are bent downwardly which webs are located between the engaging plate 15 and frame 11, as well as the last mentioned parts themselves form resilient members or spring sections which impart upon the slip-on piece the necessary adaptability to the track link 1—10.

In cooperation with the preload of the vulcanized-in rubber cushion 12, these rubber cushions assure the required clamping effect on the slip-in piece in the track link. Instead of making the base body of the slip-on piece of one part by punching and deforming the same in conformity with later requirements, it is of course possible to obtain the same effect by two correspondingly preformed sheet metal parts which are either riveted or welded to each other.

It is, of course, to be understood that the present invention is, by no means, limited to the specific showing in the drawings but also comprises any modifications within the scope of the appended claims.

What I claim is:

1. A track link unit which includes: a track link having lateral tubular members arranged in spaced relationship to each other, connecting means rigidly connecting said tubular members to each other, pad means connected to one and the same side of said tubular members, each of said tubular members having that side thereof which is opposite to and faces away from said pad means provided with a groove, said grooves facing each other, and a slip-on plate structure having a first resilient section with lateral portions resting against said lateral tubular members, said slip-on plate structure also having a second resilient section having its lateral end portions angled off from the major plane of said slip-on member toward the respective adjacent groove and resiliently engaging same.

2. A track link unit according to claim 1, which includes traveling elastically deformable cushion means connected to said slip-on plate structure.

3. A track link unit according to claim 1, in which said first and second resilient sections form parts of a single plate structure.

4. A track link unit according to claim 1, in which said first and second resilient sections form punched out sections while forming a single piece with each other.

5. A track link unit according to claim 1, in which said slip-on plate structure is provided with stiffening corrugations extending in a direction transverse to the longitudinal extensions thereof.

* * * * *